(12) United States Patent
Yang (10) Patent No.: US 11,112,668 B2
(45) Date of Patent: Sep. 7, 2021

(54) ARRAY SUBSTRATE AND DISPLAY PANEL

(71) Applicants: CHONGQING HKC OPTOELECTRONICS TECHNOLOGY CO., LTD., Chongqing (CN); HKC CORPORATION LIMITED, Shenzhen (CN)

(72) Inventor: Chunhui Yang, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

( * ) Notice: Subject to any disclaimer, the term of this patent is extended or adjusted under 35 U.S.C. 154(b) by 476 days.

(21) Appl. No.: 16/311,172

(22) PCT Filed: Oct. 23, 2018

(86) PCT No.: PCT/CN2018/111303
§ 371 (c)(1),
(2) Date: Dec. 19, 2018

(87) PCT Pub. No.: WO2020/062369
PCT Pub. Date: Apr. 2, 2020

(65) Prior Publication Data
US 2021/0223600 A1 Jul. 22, 2021

(30) Foreign Application Priority Data

Sep. 30, 2018 (CN) .......................... 201821620224.2

(51) Int. Cl.
*G02F 1/1362* (2006.01)
*G09G 3/36* (2006.01)

(52) U.S. Cl.
CPC .... *G02F 1/13629* (2021.01); *G02F 1/136295* (2021.01); *G09G 3/3688* (2013.01)

(58) Field of Classification Search
CPC .......... G02F 1/13629; G02F 1/136295; G09G 3/3688
See application file for complete search history.

(56) References Cited

U.S. PATENT DOCUMENTS

2013/0321728 A1* 12/2013 Chen ..................... G02F 1/1345
349/41

FOREIGN PATENT DOCUMENTS

| CN | 101256297 A | * | 9/2008 | .......... G02F 1/1309 |
| CN | 101256297 A | | 9/2008 | |
| CN | 103474418 A | | 12/2013 | |

OTHER PUBLICATIONS

Mingsheng Dou, the ISA written comments, Jul. 2019. CN.

* cited by examiner

*Primary Examiner* — Donald L Raleigh (57) ABSTRACT

The present application discloses an array substrate and a display panel. In the array substrate, a contact-hole shorting bar includes a first side edge and a second side edge arranged in parallel, and distances from an edge of a contact hole to the first side edge and the second side edge are greater than zero.

18 Claims, 7 Drawing Sheets

ARRAY SUBSTRATE AND DISPLAY PANEL

This application claims priority to Chinese Patent Application No. CN201821620224.2, filed with the Chinese Patent Office on Sep. 30, 2018 and entitled "ARRAY SUBSTRATE AND DISPLAY PANEL", which is incorporated herein by reference in its entirety.

TECHNICAL FIELD

The present application relates to the field of display technology, and in particular, to an array substrate and a display panel.

BACKGROUND

Descriptions herein merely provide background information related to the present application, and do not necessarily constitute the prior art.

A liquid crystal display includes two parts of a liquid crystal panel and a backlight module, and a working principle thereof is placing liquid crystal molecules between two parallel glass substrates, and applying a drive voltage on the two glass substrates to control rotation directions of the liquid crystal molecules, to refract light rays of the backlight module to generate images.

The liquid crystal alignment process belongs to the cell process. An alignment technology is using a physical or a chemical method to enable an alignment film to have a capability of arranging liquid crystal molecules along the same direction at a certain pretilt angle, that is, to enable the alignment film to have a capability of arranging the liquid crystal molecules in anisotropy. Based on that liquid crystal display modes are different or molecular structures of a selected Polyimide liquid (PI, an alignment liquid) are different, there are two alignment technologies for the liquid crystal molecules, that is, a rubbing alignment technology and an optical alignment technology. A short circuit is easy to occur in an alignment circuit configured on an array substrate, hindering implementation of an optical alignment.

SUMMARY

The objective of the present application is to provide an array substrate, to facilitate an optical alignment.

To achieve the foregoing objective, the present application provides an array substrate, comprising: data lines; a display area and a peripheral area; a multiplicity of pixel elements, formed in the display area; and a multiplicity of alignment circuits, formed in the peripheral area, and configured to align liquid crystals in the pixel elements, wherein the alignment circuit comprises a first bonding pad and a multiplicity of shorting bars, each of the shorting bars is electrically connected to the first bonding pad through a transition line, the shorting bar comprises a contact-hole shorting bar having a contact hole, the transition line comprises a contact-hole transition line, the contact-hole shorting bar and the contact-hole transition line are arranged at different metal layers, the contact-hole shorting bar is connected to the transition line through the contact hole, the contact-hole shorting bar comprises a first side edge and a second side edge arranged in parallel, and distances from an edge of the contact hole to the first side edge and the second side edge are greater than zero.

Optionally, the distances from the edge of the contact hole to the first side edge and the second side edge are equal.

Optionally, the shorting bar comprises a flat shorting bar, the transition line comprises a flat transition line, the flat shorting bar is electrically connected to the first bonding pad through the flat transition line, and the flat shorting bar and the flat transition line are formed by using a manufacture procedure of the same metal layer.

Optionally, there are at least two flat shorting bars, each of the flat shorting bars is arranged at a different metal layer, and the flat transition line and the flat shorting bar connected thereto are formed by using the same manufacture procedure.

Optionally, the contact-hole shorting bar comprises a first contact-hole shorting bar and a second contact-hole shorting bar, the first contact-hole shorting bar and the second contact-hole shorting bar are formed by using a manufacture procedure of the same metal layer, the first contact-hole shorting bar and the second contact-hole shorting bar are arranged in parallel, and contact-hole transition lines connected to the first contact-hole shorting bar and contact-hole transition lines connected to the second contact-hole shorting bar are arranged in parallel and are alternately arranged at even intervals.

Optionally, the contact-hole shorting bar comprises a first contact-hole shorting bar and a second contact-hole shorting bar, the first contact-hole shorting bar and the second contact-hole shorting bar are formed by using a manufacture procedure of the same metal layer, the first contact-hole shorting bar and the second contact-hole shorting bar are arranged in parallel; and the contact-hole transition line comprises first contact-hole transition lines and second contact-hole transition lines, the data lines comprise a multiplicity of odd-numbered data lines and a multiplicity of even-numbered data lines, the odd-numbered data lines and the even-numbered data lines are arranged at intervals, the first contact-hole transition lines are coupled to the odd-numbered data lines, the second contact-hole transition lines are coupled to the even-numbered data lines, and the first contact-hole transition lines and the second contact-hole transition lines are arranged in parallel and are alternately arranged at even intervals.

Optionally, the data lines comprise a first color resist data line, a second color resist data line, and a third color resist data line; the contact-hole shorting bar comprises a first contact-hole shorting bar, a second contact-hole shorting bar, and a third contact-hole shorting bar; the contact-hole transition line comprises a first contact-hole transition line connected to the first color resist data line and the first contact-hole shorting bar, a second contact-hole transition line connected to the second color resist data line and the second contact-hole shorting bar, and a third contact-hole transition line connected to the third color resist data line and the third contact-hole shorting bar; and the first contact-hole transition line, the second contact-hole transition line, and the third contact-hole transition line form a group and are arranged at even intervals.

Optionally, the data lines comprise a first color resist data line, a second color resist data line, a third color resist data line, and a fourth color resist data line; the contact-hole shorting bar comprises a first contact-hole shorting bar, a second contact-hole shorting bar, a third contact-hole shorting bar, and a fourth contact-hole shorting bar; the contact-hole transition line comprises a first contact-hole transition line connected to the first color resist data line and first contact-hole shorting bar, a second contact-hole transition line connected to the second color resist data line and the second contact-hole shorting bar, a third contact-hole transition line connected to the third color resist data line and the third contact-hole shorting bar, and a fourth contact-hole transition line connected to the fourth color resist data line and the fourth contact-hole shorting bar; and the first contact-hole transition line, the second contact-hole transition line, the third contact-hole transition line, and the fourth contact-hole transition line form a group and are arranged at even intervals.

Optionally, the width of the contact hole is greater than that of the contact-hole transition line.

Another objective of the present application is to provide a display panel facilitating an optical alignment.

The display panel comprises the above-mentioned array substrate and an opposite substrate arranged opposite thereto, a liquid crystal layer being arranged between the array substrate and the opposite substrate.

Setting distances from an edge of the contact hole to the first side edge and the second side edge to be greater than zero allows the transition line to keep away from an edge location of the shorting bar when being etched. Because a middle location that is of the contact-hole shorting bar and that is formed by etching is relatively flat, the contact hole of the contact-hole transition line is arranged at a relatively flat position of the contact-hole shorting bar, effectively alleviating a short circuit caused by a connection of neighboring contact-hole transition lines. In this way, a signal of an optical alignment can normally apply, through a circuit preset on the array substrate, a voltage to the array substrate and/or the opposite substrate arranged opposite thereto, facilitating an optical alignment action, and effectively avoiding impacts of a potential trouble of short circuit on the array substrate. Moreover, at a corresponding edge location of the contact-hole shorting bar, although unflatness is caused due to etching residues at the edge location of the contact-hole shorting bar, because the line width of the transition line is smaller than that of the contact hole, a distance between two neighboring transition lines at an edge of the shorting bar is relatively increased, and a possibility of a short circuit between the neighboring transition lines due to etching residues is still much small. Meanwhile, arranging the contact hole at a middle area that is of the contact-hole shorting bar and that is relatively flat with respect to the edge provides higher efficiency of etching to form the contact hole, thereby improving efficiency of forming the contact hole, and bringing in a more regular shape to the contact hole formed through etching. Therefore, the transition line can be better connected to the shorting bar through the contact hole.

BRIEF DESCRIPTION OF DRAWINGS

The drawings included are used for providing understanding of embodiments of the present application, constitute part of the specification, and are used for illustrating implementation manners of the present application, and interpreting principles of the present application together with text description. Apparently, the drawings in the following description are merely some embodiments of the present application, and for a person of ordinary skill in the art, other drawings can also be obtained according to the drawings without contributing creative labor. In the drawings.

DETAILED DESCRIPTION

Specific structure and function details disclosed herein are only representative and are used for the purpose of describing exemplary embodiments of the present application. However, the present application may be specifically achieved in many alternative forms and shall not be interpreted to be only limited to the embodiments described herein.

In the description of the present application, it should be understood that directional or positional relationships indicated by terms such as "center", "transverse", "on", "below", "left", "right", "vertical", "horizontal", "top", "bottom", "in", and "out" are directional or positional relationships shown in the accompanying drawings, are merely intended to describe the present application conveniently and simplify the description, but are not intended to indicate or imply that the device or element needs to have a particular direction, or be manufactured and operated in particular directions. Therefore, the directional or positional relationships cannot be explained as a limitation to the present application. In addition, terms such as "first" and "second" are merely intended for description, and cannot be understood as indicating or implying comparative importance or implicitly indicating the quantity of the technical features. Therefore, features defined by "first" and "second" can explicitly or implicitly include one or more of the features. In the description of the present application, unless otherwise defined, "a multiplicity of" means two or more than two. In addition, the term "include" and any variation thereof intend to cover the non-exclusive inclusion.

In the description of the present application, it should be noted that unless being explicitly prescribed and defined, terms such as "installation", "be connected to", and "connection" should be understood broadly, for example, may be a fixed connection, or may be a detachable connection, or an integral connection; may be a mechanical connection, or may be an electric connection; may be a direction connection, or may be an indirection connection by means of an intermediate medium; or may be a connection between two elements. A person of ordinary skill in the art may understand specific meanings of the foregoing terms in the present application according to specific conditions.

Terms used herein are merely intended to describe specific embodiments but are not intended to limit exemplary embodiments. Unless being clearly indicated in the context, singular expressions "a" and "one" used herein are further intended to include plurals. It should also be understood that the term "include" and/or "comprise" used herein specifies existence of the stated features, integrals, steps, operations, elements, and/or components, but does not exclude the existence or adding of one or more other features, integrals, steps, operations, elements, components, and/or combinations thereof.

In the figures, elements with similar structures are represented by using the same reference number.

An array substrate and a display panel in the present application are described in detail below with reference to embodiments of FIG. 1 to FIG. 13.

As shown in FIG. 1 to FIG. 13, the present application discloses an array substrate 300, including:
- data lines;
- a display area 301 and a peripheral area 302;
- a multiplicity of pixel elements 303, formed in the display area 301; and
- a multiplicity of alignment circuits 10, formed in the peripheral area 302, and configured to align liquid crystals in the pixel elements 303.

The alignment circuit 10 includes a first bonding pad 11 and a multiplicity of shorting bars 12. Each of the shorting bars 12 is electrically connected to the first bonding pad 11 through a transition line 13. The shorting bar 12 includes a contact-hole shorting bar 14 having a contact hole 123. The transition line 13 includes a contact-hole transition line 15. The contact-hole shorting bar 14 and the contact-hole transition line 15 are arranged at different metal layers. The contact-hole shorting bar 14 is connected to the transition line 13 through the contact hole 123. The contact-hole shorting bar 14 includes a first side edge 121 and a second side edge 122 arranged in parallel. Distances from an edge of the contact hole to the first side edge 121 and the second side edge 122 are greater than zero.

Setting distances from the contact hole 123 to the first side edge 121 and the second side edge 122 to be greater than zero allows the transition line 13 to keep away from an edge location of the shorting bar when being etched. Because a middle location that is of the contact-hole shorting bar 14 and that is formed by etching is relatively flat, the contact hole of the contact-hole transition line 15 is arranged at a relatively flat position of the contact-hole shorting bar 14, effectively alleviating a short circuit caused by a connection of neighboring contact-hole transition lines 15. In this way, a signal of an optical alignment can normally apply, through a circuit preset on the array substrate 300, a voltage to the array substrate 300 and/or an opposite substrate 200 arranged opposite thereto, facilitating an optical alignment action, and effectively avoiding impacts of a potential trouble of short circuit on the array substrate 300. Moreover, at a corresponding edge location of the contact-hole shorting bar 14, although unflatness is caused due to etching residues at the edge location of the contact-hole shorting bar 14, because the line width of the transition line 13 is smaller than that of the contact hole, a distance between two neighboring transition lines 13 at an edge of the shorting bar is relatively increased, and a possibility of a short circuit between the neighboring transition lines 13 due to etching residues is still much small. Meanwhile, arranging the contact hole at a middle area that is of the contact-hole shorting bar 14 and that is relatively flat with respect to the edge provides higher efficiency of etching to form the contact hole, thereby improving efficiency of forming the contact hole, and bringing in a more regular shape to the contact hole formed through etching. Therefore, the transition line 13 can be better connected to the shorting bar through the contact hole.

Optionally, in this implementation manner, decreasing a set width of the contact hole on the contact-hole shorting bar 14 enables the distances from the edge of the contact hole to the first side edge 121 and the second side edge 122 to be greater than zero, thereby ensuring that the contact hole is arranged at a location away from the edge location of the contact-hole shorting bar 14.

Optionally, in this implementation manner, increasing the width of the contact-hole shorting bar 14, that is, increasing the distances from the first side edge 121 to the second side edge 122 enables the distances from the edge of the contact hole to the first side edge 121 and the second side edge 122 to be greater than zero, thereby ensuring that the contact hole is arranged at a location away from the edge location of the contact-hole shorting bar 14.

Another implementation manner of the present application discloses that the distances from the edge of the contact hole to the first side edge 121 and the second side edge 122 are equal, so that the contact hole is arranged at a location of a medial axis of the first side edge 121 and the second side edge 122 of the contact-hole shorting bar 14. Higher flatness of a location at the medial axis of the contact-hole shorting bar 14 can more effectively alleviate a short circuit caused by a connection of neighboring contact-hole transition lines 15, thereby further facilitating an optical alignment action. Moreover, forming the contact hole at a location having higher flatness provides higher efficiency of etching to form the contact hole, thereby improving efficiency of forming the contact hole, and bringing in a more regular shape to the contact hole formed through etching. Therefore, the transition line can be better connected to the shorting bar through the contact hole.

Figure 8:
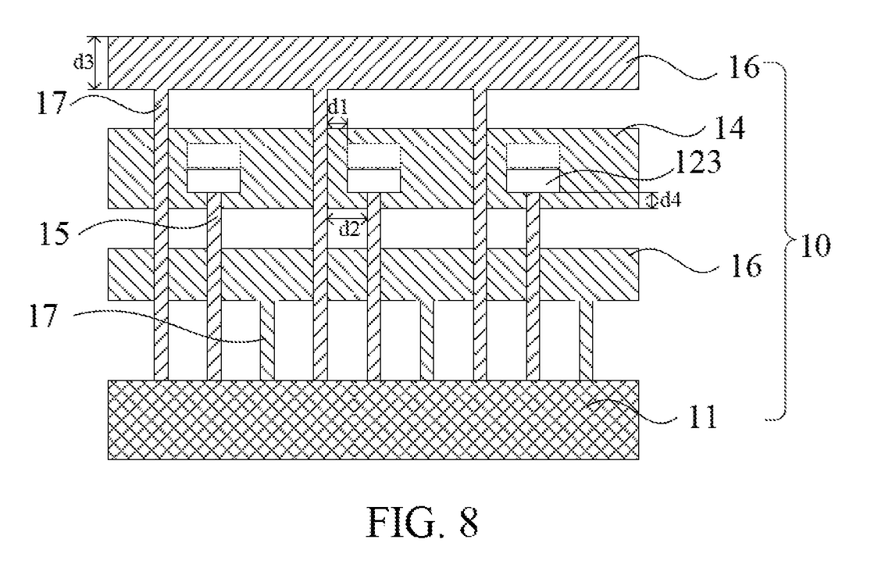
FIG. 8 is a schematic diagram of an alignment circuit according to another embodiment of the present application.
Figure 9:
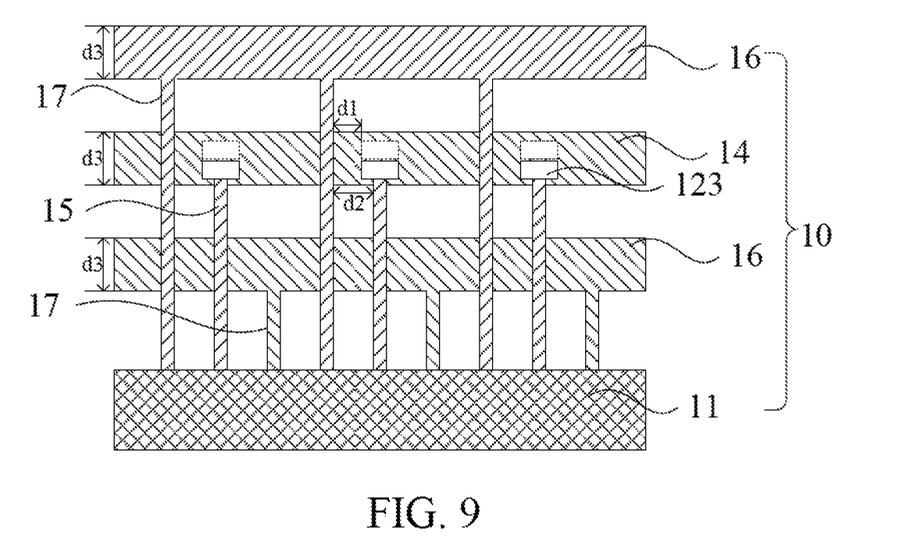
FIG. 9 is a schematic diagram of an alignment circuit according to another embodiment of the present application.

As shown in FIG. 8 and FIG. 9, the shorting bar includes a flat shorting bar 16. The transition line includes a flat transition line 17. The flat shorting bar 16 is electrically connected to the first bonding pad 11 through the flat transition line 17. Because the flat shorting bar 16 and the flat transition line 17 formed by using a manufacture procedure of the same metal layer are made through the same manufacture procedure, a disconnection between the flat shorting bar 16 and the flat transition line 17 can be more effectively avoided. Moreover, arranging the flat shorting bar 16 and the flat transition line 17 at the same metal layer makes it simpler to arrange the flat shorting bar 16 and the flat transition line 17, effectively improving manufacturing efficiency of the array substrate 300. Optionally, quantities set for the flat shorting bar 16 and the contact-hole shorting bar 14 may be randomly combined, and the quantities may be randomly combined based on the size of a panel and design requirements. These all fall within the protection scope of the solution of the present application.

Optionally, in this implementation manner, there are at least two flat shorting bars 16, each of the flat shorting bars 16 is arranged at a different metal layer, and the flat transition line 17 and the flat shorting bar 16 connected thereto are formed by using the same manufacture procedure. Because flat layers are arranged at different metal layers, the flat transition line 17 is also at a different metal layer. Moreover, covering a protective layer on each metal layer can effectively avoid impacts of etching residues, thereby effectively alleviating a short circuit that is of the transition line and that is caused by etching residues along an edge of the shorting bar, and ensuring that the array substrate 300 can better complete an optical alignment action.

Optionally, in this implementation manner, two flat shorting bars 16 are arranged, each of the flat shorting bars 16 is arranged at a different metal layer; and a contact-hole shorting bar 14 is arranged between the two flat shorting bars 16. One of the flat shorting bars 16 is arranged through a first metal layer, and the other flat shorting bar 16 is arranged through a second metal layer. The cabling width of the contact-hole shorting bar 14 is increased, that is, the contact-hole shorting bar 14 is increased by d4 (d4>0 um). As a result, distances that are between the flat transition line 17 and the contact-hole transition line 15 and that are along an edge of the contact-hole shorting bar 14 are increased, that is, d2>d1. To be specific, a short circuit between the flat transition line 17 and the contact-hole transition line 15 that is caused by etching residues of the second metal layer can be alleviated.

As shown in FIG. 5 to FIG. 12, the contact-hole shorting bar 14 includes a first contact-hole shorting bar 141 and a second contact-hole shorting bar 142. The first contact-hole shorting bar 141 and the second contact-hole shorting bar 142 are formed by using a manufacture procedure of the same metal layer and are arranged in parallel. Because contact-hole transition lines 15 connected to the first contact-hole shorting bar 141 and contact-hole transition lines 15 connected to the second contact-hole shorting bar 142 are arranged in parallel and are alternately arranged at even intervals, more contact-hole transition lines 15 can be arranged on the contact-hole shorting bar having a limited length, thereby ensuring a better optical alignment effect. Arranging the transition lines at intervals can effectively prevent the transition lines from interfering with each other. Arranging in parallel can decreasing a connection length of the contact-hole transition line 15 from the contact-hole shorting bar to the first bonding pad 11, effectively reducing impedance of the contact-hole transition line 15, and can save metal consumables.

Figure 1:
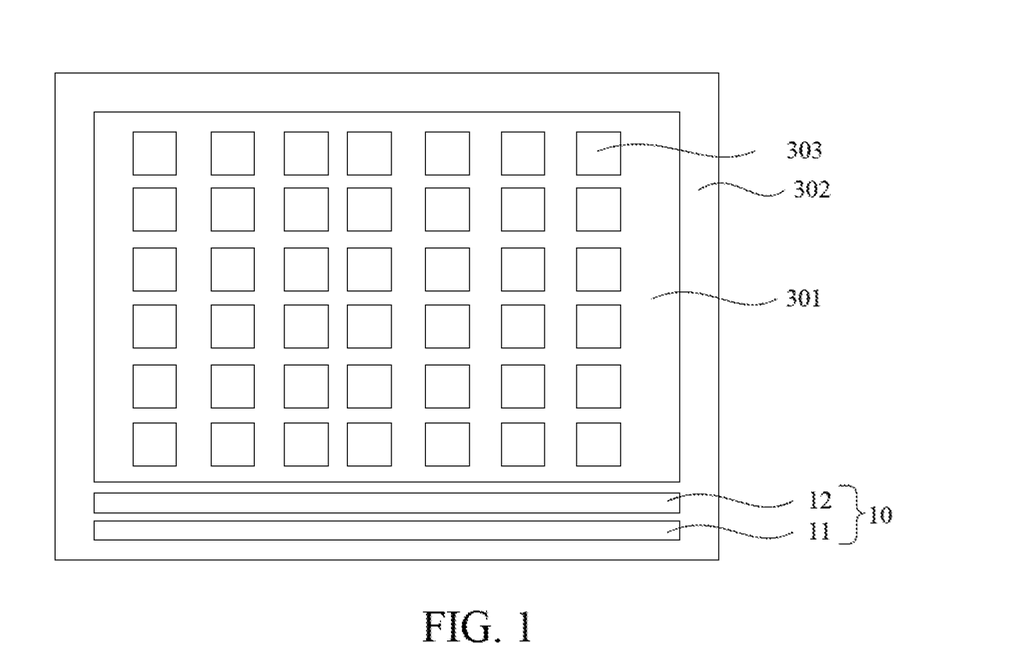
FIG. 1 is a schematic diagram of an array substrate according to an embodiment of the present application.
Figure 2:
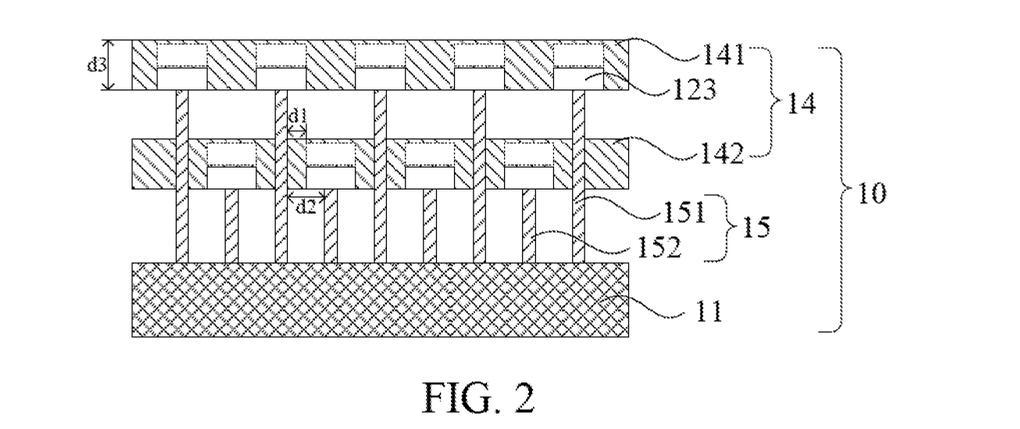
FIG. 2 is a schematic diagram of an alignment circuit according to another embodiment of the present application.
Figure 3:
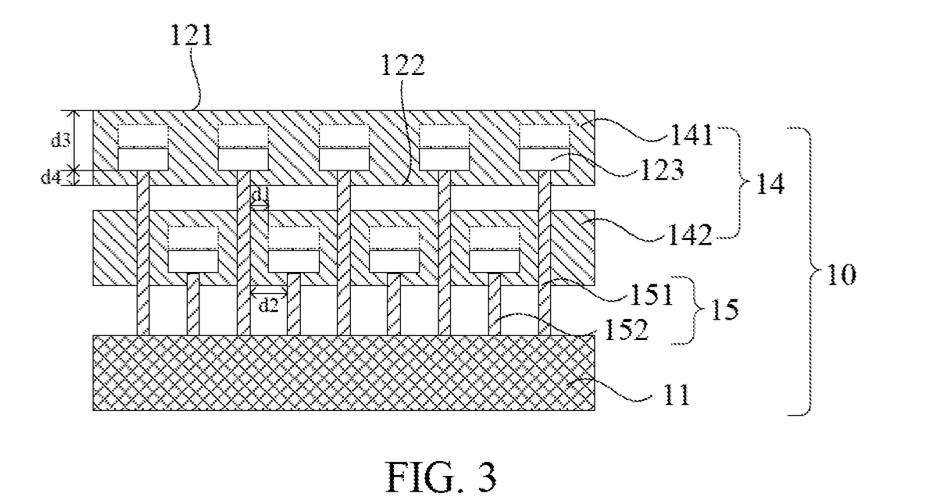
FIG. 3 is a schematic diagram of an alignment circuit according to another embodiment of the present application.
Figure 4:
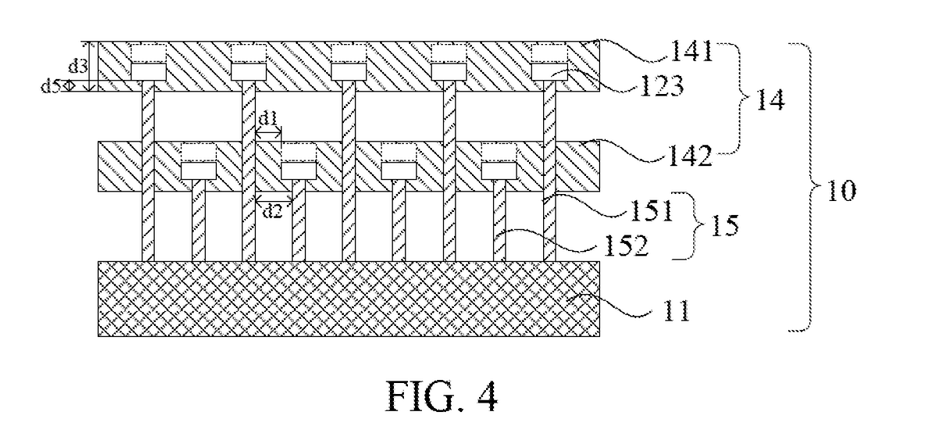
FIG. 4 is a schematic diagram of an alignment circuit according to another embodiment of the present application.

As shown in FIG. 2 to FIG. 4, the contact-hole shorting bar includes a first contact-hole shorting bar 141 and a second contact-hole shorting bar 142. The first contact-hole shorting bar 141 and the second contact-hole shorting bar 142 are formed by using a manufacture procedure of the same metal layer and are arranged in parallel. The contact-hole transition line 15 includes first contact-hole transition lines 151 and second contact-hole transition lines 152. The data lines include a multiplicity of odd-numbered data lines and a multiplicity of even-numbered data lines that are arranged at intervals. The first contact-hole transition lines 151 are coupled to the odd-numbered data lines, the second contact-hole transition lines 152 are coupled to the even-numbered data lines, and the first contact-hole transition lines 151 and the second contact-hole transition lines 152 are arranged in parallel and are alternately arranged at even intervals. A signal of an optical alignment enters into a chip from cabling of the shorting bar and after the first bonding pad 11 is tested. A mode commonly used for performing the optical alignment action is a 2G2D power supply mode. That is, the data lines and scanning lines are respectively connected to the first bonding pad 11 in an odd power supply manner and an even power supply manner, to supply power to the chip and align the chip. The first contact-hole transition lines 151 and the second contact-hole transition lines 152 respectively correspond to the odd-numbered data lines and the even-numbered data lines. The first contact-hole shorting bar 141 and the second contact-hole shorting bar 142 respectively correspond to the odd-numbered data lines and the even-numbered data lines. The first contact-hole shorting bar 141 is connected to the first contact-hole transition line 151 through the contact hole. The second contact-hole shorting bar 142 is connected to the second contact-hole transition line 152 through the contact hole. Because distances to the first bonding pad 11 are limited and are constant, a distance between the first contact-hole transition line 151 and the second contact-hole transition line 152 is also limited.

As shown in FIG. 2, for the contact hole that is on cabling of the shorting bar and that is not disclosed by the applicant, the second metal layer that forms a component of the contact hole flushes with the edge of the shorting bar. Spacing distances between the same type of metal flying leads on the edge of the shorting bar directly affect occurrences of etching residues. As a result, short circuits occur on the odd-numbered data lines and the even-numbered data lines. That is, increasing the spacing distances between the same type of metal flying leads on the edge of the shorting bar may alleviate the short circuits caused by the etching residues.

As shown in FIG. 3, by increasing the widths of both the first contact-hole shorting bar 141 and the second contact-hole shorting bar 142 by d4 (d4>0 um), distances that are between the first contact-hole transition line 151 and the second contact-hole transition line 152 and that are along an edge of the contact-hole shorting bar are increased, that is, d2>d1. To be specific, a short circuit between the first contact-hole transition line 151 and the second contact-hole transition line 152 that is caused by etching residues of the second metal layer can be alleviated.

As shown in FIG. 4, by decreasing the widths of the contact holes on both the first contact-hole shorting bar 141 and the second contact-hole shorting bar 142 by d5 (d5>0 um), distances that are between a transition line 1 and a transition line 2 and that are along the edge of the contact-hole shorting bar are increased, that is, d2>d1. To be specific, the short circuit between the first contact-hole transition line 151 and the second contact-hole transition line 152 that is caused by etching residues of the metal layer can be alleviated.

Optionally, increasing the cabling width of the contact-hole shorting bar or decreasing the width of the contact hole on cabling of the contact-hole shorting bar can be randomly combined, and details are not described herein.

Setting the distances from the edge of the contact hole to the first side edge 121 and the second side edge 122 to be greater than zero allows the transition line to keep away from an edge location of the shorting bar when being etched. Because a middle location that is of the contact-hole shorting bar and that is formed by etching is relatively flat, the contact hole of the contact-hole transition line is arranged at a relatively flat position of the contact-hole shorting bar, effectively alleviating a short circuit caused by a connection of neighboring contact-hole transition lines. Moreover, arranging the contact hole at a middle area that is of the contact-hole shorting bar and that is relatively flat with respect to the edge provides higher efficiency of etching to form the contact hole, thereby improving efficiency of forming the contact hole, and bringing in a more regular shape to the contact hole formed through etching. Therefore, the transition line can be better connected to the shorting bar through the contact hole.

As shown in FIG. 5 to FIG. 9, the data lines include a first color resist data line, a second color resist data line, and a third color resist data line. The contact-hole shorting bar includes the first contact-hole shorting bar 141, the second contact-hole shorting bar 142, and a third contact-hole shorting bar 143. The contact-hole transition line includes a first contact-hole transition line 151 connected to the first color resist data line and the first contact-hole shorting bar 141, a second contact-hole transition line 152 connected to the second color resist data line and the second contact-hole shorting bar 142, and a third contact-hole transition line 153 connected to the third color resist data line and the third contact-hole shorting bar 143. The fst contact-hole transition line 151, the second contact-hole transition line 152, and the third contact-hole transition line 153 form a group and are arranged at even intervals. A signal of an optical alignment enters into a chip from cabling of the shorting bar and after the first bonding pad 11 is tested. A mode commonly used for performing the optical alignment action is a 4G3D or 2G3D power supply mode. That is, the data lines including a red color resist data line, a green color resist data line, and a blue color resist data line and scanning lines including G1/G2/G3/G4 are respectively connected to the first bonding pad 11 in an odd power supply manner and an even power supply manner, to supply power to the chip and align the chip. The first contact-hole transition line 151, the second contact-hole transition line 152, and the third contact-hole transition line 153 respectively correspond to the red color resist data line (R data line), the green color resist data line (G data line), and the blue color resist data line (B data line). The first contact-hole shorting bar 141, the second contact-hole shorting bar 142, and the third contact-hole shorting bar 143 respectively correspond to the red color resist data line (R data line), the green color resist data line (G data line), and the blue color resist data line (B data line). The first contact-hole shorting bar 141 is connected to the first contact-hole transition line 151 through the contact hole. The second contact-hole shorting bar 142 is connected to the second contact-hole transition line 152 through the contact hole. The third contact-hole shorting bar 143 is connected to the third contact-hole transition line 153 through the contact hole. Because distances to the first bonding pad 11 are limited and are constant, distances between the first contact-hole transition line 151 and the second contact-hole transition line 152 and between the second contact-hole transition line 152 and the third contact-hole transition line 153 are also limited, and the two distances are equal.

Figure 5:
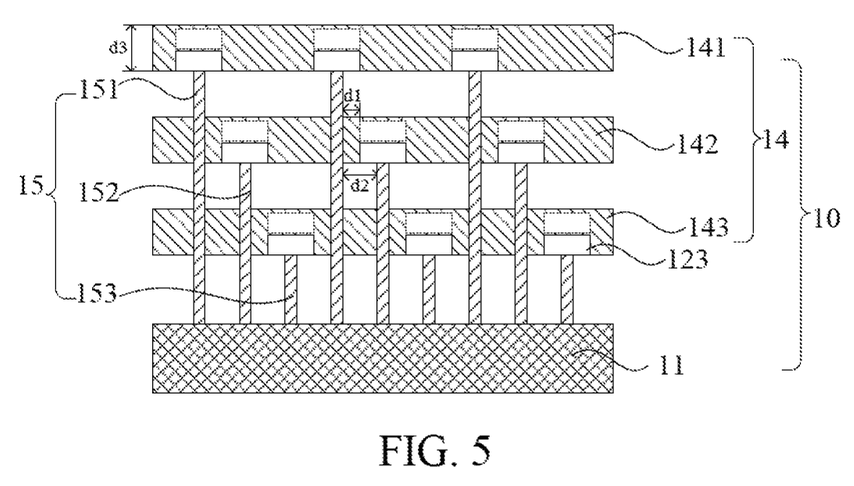
FIG. 5 is a schematic diagram of an alignment circuit according to another embodiment of the present application.

As shown in FIG. 5, for the contact hole that is on cabling of the shorting bar and that is not disclosed by the applicant, the second metal layer that forms a component of the contact hole flushes with the edge of the shorting bar. Spacing distances between the same type of metal flying leads on the edge of the shorting bar directly affect occurrences of etching residues. As a result, short circuits occur on the odd-numbered data lines and the even-numbered data lines. That is, increasing the spacing distances between the same type of metal flying leads on the edge of the shorting bar may alleviate the short circuits caused by the etching residues.

Figure 6:
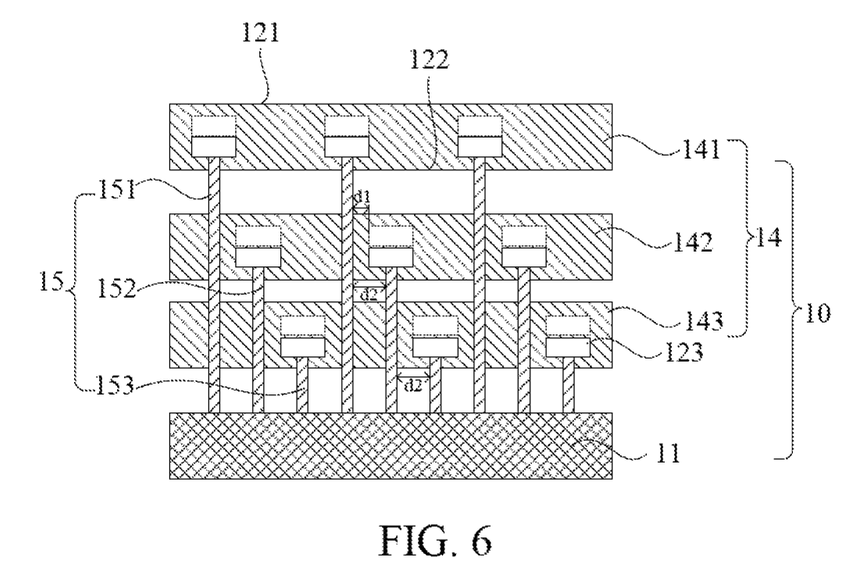
FIG. 6 is a schematic diagram of an alignment circuit according to another embodiment of the present application.

As shown in FIG. 6, by increasing the widths of the first contact-hole shorting bar 141, the second contact-hole shorting bar 142, and the third contact-hole shorting bar 143 by d4 (d4>0 um), distances that are between the first contact-hole transition line 151 and the second contact-hole transition line 152 and between the second contact-hole transition line 152 and the third contact-hole transition line 153 and that are along an edge of the contact-hole shorting bar are increased, that is, d2>d1. To be specific, short circuits between the first contact-hole transition line 151 and the second contact-hole transition line 152 and between the second contact-hole transition line 152 and the third contact-hole transition line 153 that are caused by etching residues of the metal layer can be alleviated.

Figure 7:
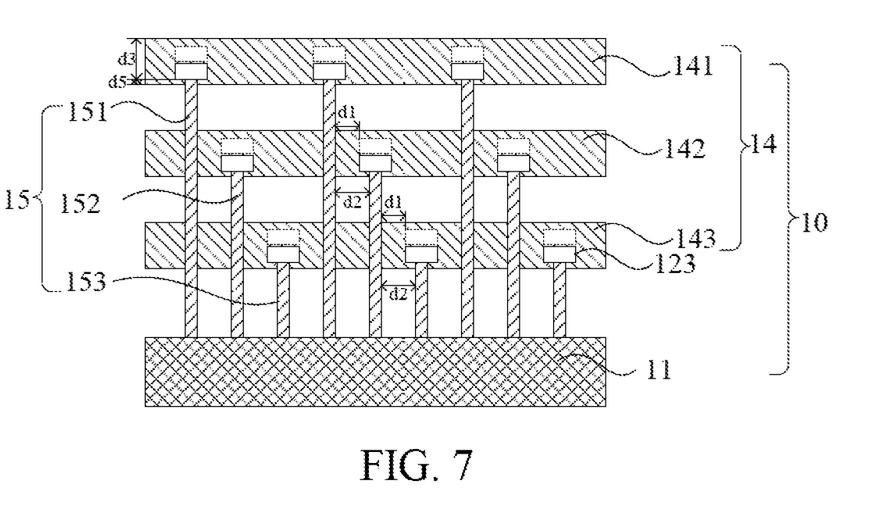
FIG. 7 is a schematic diagram of an alignment circuit according to another embodiment of the present application.

As shown in FIG. 7, by decreasing the widths of the contact holes on the first contact-hole shorting bar 141, the second contact-hole shorting bar 142, and the third contact-hole shorting bar 143 by d5 (d5>0 um), distances that are between a transition line 1 and a transition line 2 and between the transition line 2 and a transition line 3 and that are along an edge of the shorting bar are increased, that is, d2>d1. To be specific, a short circuit between the transition line 1 and the transition line 2 due to M2 and a short circuit between the transition line 2 and the transition line 3 due to etching residues can be alleviated.

Setting the distances from the edge of the contact hole to the first side edge 121 and the second side edge 122 to be greater than zero allows the transition line to keep away from an edge location of the shorting bar when being etched. Because a middle location that is of the contact-hole shorting bar and that is formed by etching is relatively flat, the contact hole of the contact-hole transition line is arranged at a relatively flat position of the contact-hole shorting bar, effectively alleviating a short circuit caused by a connection of neighboring contact-hole transition lines. Moreover, at a corresponding edge location of the contact-hole shorting bar, although unflatness is caused due to etching residues at the edge location of the contact-hole shorting bar, because the line width of the transition line is smaller than that of the contact hole, a distance between two neighboring transition lines at an edge of the shorting bar is relatively increased, and a possibility of a short circuit between the neighboring transition lines due to etching residues is still much small.

Figure 10:
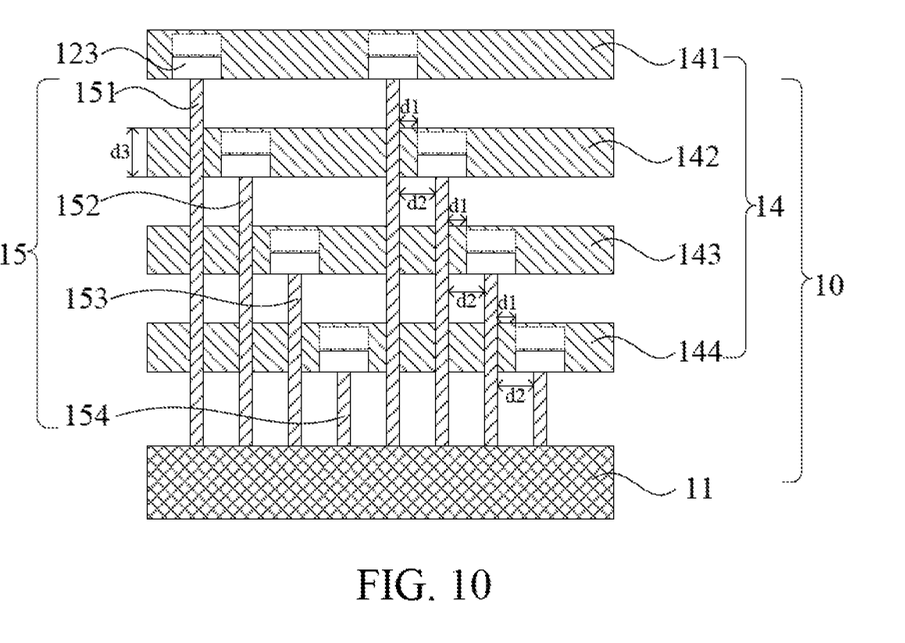
FIG. 10 is a schematic diagram of an alignment circuit according to another embodiment of the present application.
Figure 11:
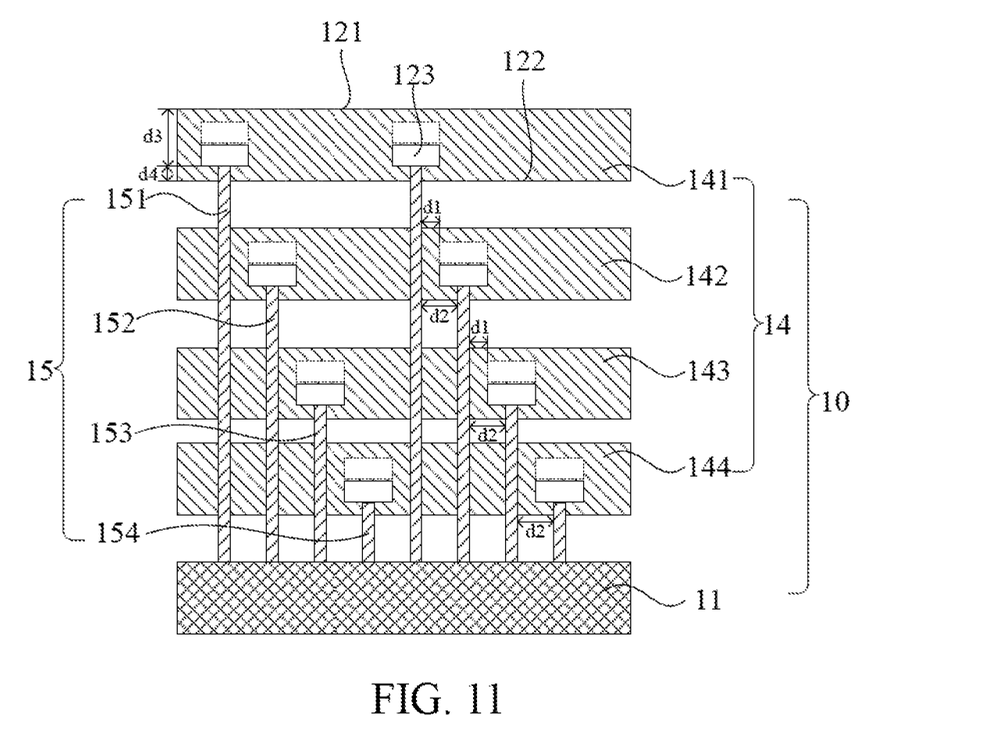
FIG. 11 is a schematic diagram of an alignment circuit according to another embodiment of the present application.
Figure 12:
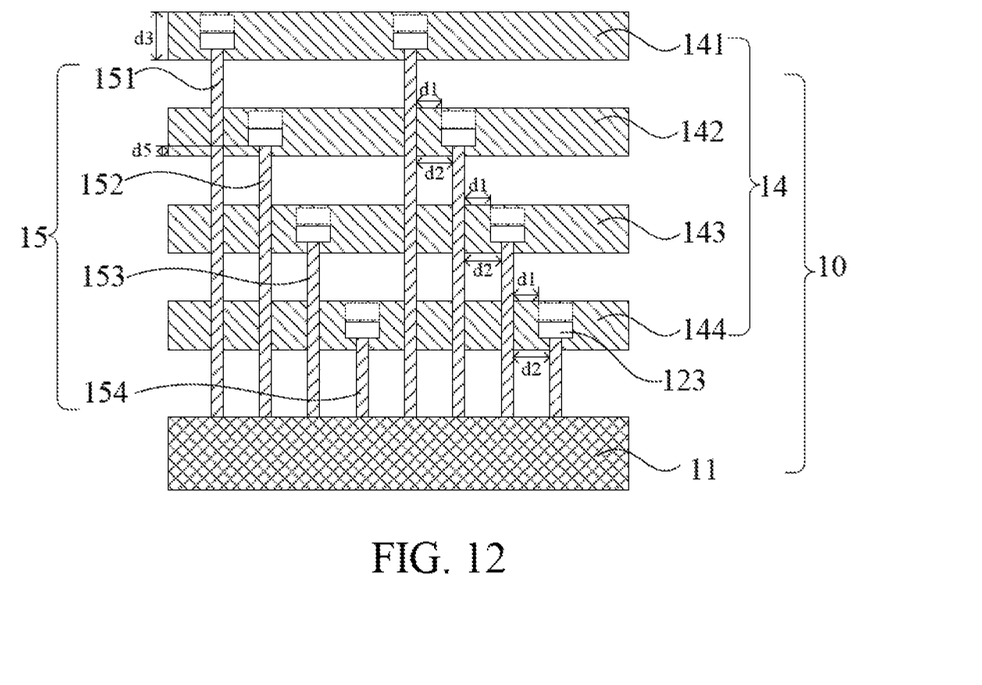
FIG. 12 is a schematic diagram of an alignment circuit according to an embodiment of the present application.

As shown in FIG. 10 to FIG. 12, the data lines include a first color resist data line, a second color resist data line, a third color resist data line, and a fourth color resist data line. The contact-hole shorting bar includes the first contact-hole shorting bar 141, the second contact-hole shorting bar 142, the third contact-hole shorting bar 143, and a fourth contact-hole shorting bar 144. The contact-hole transition line includes a first contact-hole transition line 151 connected to the first color resist data line and the first contact-hole shorting bar 141, a second contact-hole transition line 152 connected to the second color resist data line and the second contact-hole shorting bar 142, a third contact-hole transition line 153 connected to the third color resist data line and the third contact-hole shorting bar 143, and a fourth contact-hole transition line 154 connected to the fourth color resist data line and the fourth contact-hole shorting bar 144. The first contact-hole transition line 151, the second contact-hole transition line 152, the third contact-hole transition line 153, and the fourth contact-hole transition line 154 form a group and are arranged at even intervals. A signal of an optical alignment enters into a chip from cabling of the shorting bar and after the first bonding pad 11 is tested. A mode commonly used for performing the optical alignment action is a 4G4D or 2G4D power supply mode. That is, the data lines including a red color resist data line, a green color resist data line, a blue color resist data line, and a white color resist data line and scanning lines including G1/G2/G3/G4 are respectively connected to the first bonding pad 11 in an odd power supply manner and an even power supply manner, to supply power to the chip and align the chip. The first contact-hole transition line 151, the second contact-hole transition line 152, the third contact-hole transition line 153, and the fourth contact-hole transition line 154 respectively correspond to the red color resist data line (R data line), the green color resist data line (G data line), the blue color resist data line (B data line), and the white color resist data line (W data line). The first contact-hole shorting bar 141, the second contact-hole shorting bar 142, the third contact-hole shorting bar 143, and the fourth contact-hole shorting bar 144 respectively correspond to the red color resist data line (R data line), the green color resist data line (G data line), the blue color resist data line (B data line), and the white color resist data line (W data line). The first contact-hole shorting bar 141 is connected to the first contact-hole transition line 151 through the contact hole. The second contact-hole shorting bar 142 is connected to the second contact-hole transition line 152 through the contact hole. The third contact-hole shorting bar 143 is connected to the third contact-hole transition line 153 through the contact hole. The fourth contact-hole shorting bar 144 is connected to the fourth contact-hole transition line 154 through the contact hole. Because distances to the bonding pad are limited and are constant, distances between the first contact-hole transition line 151 and the second contact-hole transition line 152, between the second contact-hole transition line 152 and the third contact-hole transition line 153, and between the third contact-hole transition line 153 and the fourth contact-hole transition line 154 are also limited, and the distances are equal.

As shown in FIG. 10, for the contact hole that is on cabling of the shorting bar and that is not disclosed by the applicant, the second metal layer that forms a component of the contact hole flushes with the edge of the shorting bar. Spacing distances between the same type of metal flying leads on the edge of the shorting bar directly affect occurrences of etching residues. As a result, short circuits occur on the odd-numbered data lines and the even-numbered data lines. That is, increasing the spacing distances between the same type of metal flying leads on the edge of the shorting bar may alleviate the short circuits caused by the etching residues.

As shown in FIG. 11, by increasing the widths of the first contact-hole shorting bar 141, the second contact-hole shorting bar 142, the third contact-hole shorting bar 143, and the fourth contact-hole shorting bar 144 by d4 (d4>0 um), distances that are between the first contact-hole transition line 151 and the second contact-hole transition line 152, between the second contact-hole transition line 152 and the third contact-hole transition line 153, and between the third contact-hole transition line 153 and the fourth contact-hole transition line 154 and that are along an edge of the contact-hole shorting bar are increased, that is, d2>d1. To be specific, a short circuit between neighboring transition lines that is caused by etching residues of the metal layer can be alleviated.

As shown in FIG. 12, by decreasing the widths of the contact holes on the first contact-hole shorting bar 141, the second contact-hole shorting bar 142, the third contact-hole shorting bar 143, and the fourth contact-hole shorting bar 144 by d5 (d5>0 um), distances that are between neighboring transition lines and that are along the edge of the contact-hole shorting bar are increased, that is, d2>d1. To be specific, a short circuit between neighboring transition lines that is caused by etching residues of the metal layer can be alleviated.

Setting the distances from the edge of the contact hole to the first side edge 121 and the second side edge 122 to be greater than zero allows the transition line to keep away from an edge location of the shorting bar when being etched. Because a middle location that is of the contact-hole shorting bar and that is formed by etching is relatively flat, the contact hole of the contact-hole transition line is arranged at a relatively flat position of the contact-hole shorting bar, effectively alleviating a short circuit caused by a connection of neighboring contact-hole transition lines. In this way, a signal of an optical alignment can normally apply, through a circuit preset on the array substrate, a voltage to the array substrate and/or the opposite substrate 200 arranged opposite thereto, facilitating an optical alignment action, and effectively avoiding impacts of a potential trouble of short circuit on the array substrate.

Figure 13:
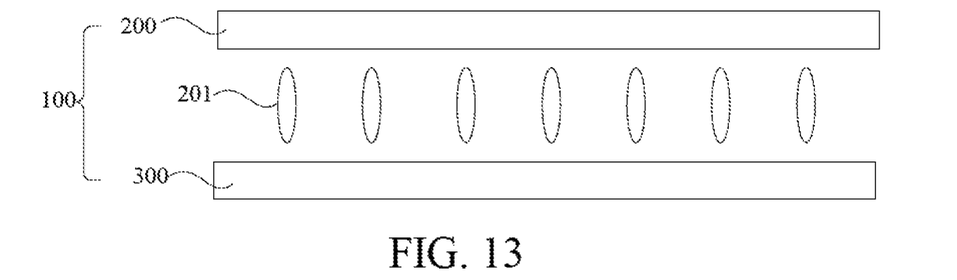
FIG. 13 is a schematic diagram of a display panel according to an embodiment of the present application.

As shown in FIG. 13, another embodiment of the present application provides a display panel 100, including the above-mentioned array substrate 300 and an opposite substrate 200 arranged opposite thereto. A liquid crystal layer 201 is arranged between the array substrate 300 and the opposite substrate 200. The display panel 100 includes a color photoresist layer that can be arranged on the substrate 200 or can be arranged on the array substrate 300. Usually, the alignment circuit is erased or removed when the display panel is manufactured as a display device. When the display panel 100 in this embodiment of the present application is a liquid crystal display, the liquid crystal display includes a backlight module that can serve as a light source for providing sufficient brightness and evenly distributed light. The backlight module in this embodiment may be a frontlit type backlight module or may be a backlit type backlight module. It should be noted that the backlight module in this embodiment is not limited thereto.

In the foregoing embodiments, the material of the substrate may be glass, a plastic transparent material, or the like.

In the foregoing embodiments, using a liquid crystal panel as an example, the liquid crystal panel includes an array substrate and a color substrate (CF) that are arranged opposite to each other. Liquid crystals and a spacing element are arranged between the array substrate and the color substrate. An active switch that is, for example, a thin film transistor (TFT) is arranged on the array substrate. A color photoresist layer is arranged on the color substrate. The color photoresist layer and the active switch can be formed on the same substrate.

In the foregoing embodiments, the array substrate includes a liquid crystal panel, an organic light-emitting diode (OLED) panel, a quantum dot light emitting diode (QLED) panel, a plasma panel, a planar panel, a curved panel, or the like. This is not limited herein.

The foregoing content describes the present application in detail with reference to the specific implementation manners, and it should not be regarded that the specific implementations of the present application are limited to these descriptions. A person of ordinary skill in the art may further make several simple deductions or replacements without departing from the conception of the present application, and these deductions or replacements shall fall within the protection scope of the present application.

What is claimed is:

1. An array substrate, comprising:
   data lines;
   a display area and a peripheral area;
   a multiplicity of pixel elements, formed in the display area; and
   a multiplicity of alignment circuits, formed in the peripheral area, and configured to align liquid crystals in the pixel elements,
   wherein the alignment circuit comprises a first bonding pad and a multiplicity of shorting bars, each of the shorting bars is electrically connected to the first bonding pad through a transition line, the shorting bar comprises a contact-hole shorting bar having a contact hole, the transition line comprises a contact-hole transition line, the contact-hole shorting bar and the contact-hole transition line are arranged at different metal layers, the contact-hole shorting bar is connected to the transition line through the contact hole, the contact-hole shorting bar comprises a first side edge and a second side edge arranged in parallel, and distances from an edge of the contact hole to the first side edge and the second side edge are greater than zero.

2. The array substrate according to claim 1, wherein the distances from the edge of the contact hole to the first side edge and the second side edge are equal.

3. The array substrate according to claim 2, wherein the shorting bar comprises a flat shorting bar, the transition line comprises a flat transition line, the flat shorting bar is electrically connected to the first bonding pad through the flat transition line, and the flat shorting bar and the flat transition line are formed by using a manufacture procedure of the same metal layer.

4. The array substrate according to claim 3, wherein there are at least two flat shorting bars, each of the flat shorting bars is arranged at a different metal layer, and the flat transition line and the flat shorting bar connected thereto are formed by using the same manufacture procedure.

5. The array substrate according to claim 2, wherein the contact-hole shorting bar comprises a first contact-hole shorting bar and a second contact-hole shorting bar, the first contact-hole shorting bar and the second contact-hole shorting bar are formed by using a manufacture procedure of the same metal layer, the first contact-hole shorting bar and the second contact-hole shorting bar are arranged in parallel, and contact-hole transition lines connected to the first contact-hole shorting bar and contact-hole transition lines connected to the second contact-hole shorting bar are arranged in parallel and are alternately arranged at even intervals.

6. The array substrate according to claim 3, wherein the contact-hole shorting bar comprises a first contact-hole shorting bar and a second contact-hole shorting bar, the first contact-hole shorting bar and the second contact-hole shorting bar are formed by using a manufacture procedure of the same metal layer, the first contact-hole shorting bar and the second contact-hole shorting bar are arranged in parallel, and contact-hole transition lines connected to the first contact-hole shorting bar and contact-hole transition lines connected to the second contact-hole shorting bar are arranged in parallel and are alternately arranged at even intervals.

7. The array substrate according to claim 4, wherein the contact-hole shorting bar comprises a first contact-hole shorting bar and a second contact-hole shorting bar, the first contact-hole shorting bar and the second contact-hole shorting bar are formed by using a manufacture procedure of the same metal layer, the first contact-hole shorting bar and the second contact-hole shorting bar are arranged in parallel, and contact-hole transition lines connected to the first contact-hole shorting bar and contact-hole transition lines connected to the second contact-hole shorting bar are arranged in parallel and are alternately arranged at even intervals.

8. The array substrate according to claim 1, wherein the contact-hole shorting bar comprises a first contact-hole shorting bar and a second contact-hole shorting bar, the first contact-hole shorting bar and the second contact-hole shorting bar are formed by using a manufacture procedure of the same metal layer, and the first contact-hole shorting bar and the second contact-hole shorting bar are arranged in parallel; and the contact-hole transition line comprises first contact-hole transition lines and second contact-hole transition lines, the data lines comprise a multiplicity of odd-numbered data lines and a multiplicity of even-numbered data lines, the odd-numbered data lines and the even-numbered data lines are arranged at intervals, the first contact-hole transition lines are coupled to the odd-numbered data lines, the second contact-hole transition lines are coupled to the even-numbered data lines, and the first contact-hole transition lines and the second contact-hole transition lines are arranged in parallel and are alternately arranged at even intervals.

9. The array substrate according to claim 1, wherein the data lines comprise a first color resist data line, a second color resist data line, and a third color resist data line; the contact-hole shorting bar comprises a first contact-hole shorting bar, a second contact-hole shorting bar, and a third contact-hole shorting bar; the contact-hole transition line comprises a first contact-hole transition line connected to the first color resist data line and the first contact-hole shorting bar, a second contact-hole transition line connected to the second color resist data line and the second contact-hole shorting bar, and a third contact-hole transition line connected to the third color resist data line and the third contact-hole shorting bar; and the first contact-hole transition line, the second contact-hole transition line, and the third contact-hole transition line form a group and are arranged at even intervals.

10. The array substrate according to claim 1, wherein the data lines comprise a first color resist data line, a second color resist data line, a third color resist data line, and a fourth color resist data line; the contact-hole shorting bar comprises a first contact-hole shorting bar, a second contact-hole shorting bar, a third contact-hole shorting bar, and a fourth contact-hole shorting bar; the contact-hole transition line comprises a first contact-hole transition line connected to the first color resist data line and first contact-hole shorting bar, a second contact-hole transition line connected to the second color resist data line and the second contact-hole shorting bar, a third contact-hole transition line connected to the third color resist data line and the third contact-hole shorting bar, and a fourth contact-hole transition line connected to the fourth color resist data line and the fourth contact-hole shorting bar; and the first contact-hole transition line, the second contact-hole transition line, the third contact-hole transition line, and the fourth contact-hole transition line form a group and are arranged at even intervals.

11. An array substrate, comprising:
a display area and a peripheral area;
a multiplicity of pixel elements, formed in the peripheral area, and comprising data lines; and
a multiplicity of alignment circuits, formed in the peripheral area, and configured to align liquid crystals in the pixel elements,
wherein the alignment circuit comprises a first bonding pad and a multiplicity of shorting bars, each of the shorting bars is electrically connected to the first bonding pad through a transition line, the shorting bar comprises a contact-hole shorting bar having a contact hole, the transition line comprises a contact-hole transition line, the contact-hole shorting bar and the contact-hole transition line are arranged at different metal layers, the contact-hole shorting bar is connected to the transition line through the contact hole, the contact-hole shorting bar comprises a first side edge and a second side edge arranged in parallel, and distances from an edge of the contact hole to the first side edge and the second side edge are equal;

the width of the contact hole is greater than that of the contact-hole transition line;

the shorting bar comprises a flat shorting bar, the transition line comprises a flat transition line, the flat shorting bar is electrically connected to the first bonding pad through the flat transition line, and the flat shorting bar and the flat transition line are formed by using a manufacture procedure of the same metal layer; and there are at least two flat shorting bars, each of the flat shorting bars is arranged at a different metal layer, and the flat transition line and the flat shorting bar connected thereto are formed by using the same manufacture procedure.

12. A display panel, comprising an array substrate and an opposite substrate arranged opposite thereto, a liquid crystal layer being arranged between the array substrate and the opposite substrate, and the array substrate comprising:

data lines;

a display area and a peripheral area;

a multiplicity of pixel elements, formed in the display area; and a multiplicity of alignment circuits, formed in the peripheral area, and configured to align liquid crystals in the pixel elements, wherein the alignment circuit comprises a first bonding pad and a multiplicity of shorting bars, each of the shorting bars is electrically connected to the first bonding pad through a transition line, the shorting bar comprises a contact-hole shorting bar having a contact hole, the transition line comprises a contact-hole transition line, the contact-hole shorting bar and the contact-hole transition line are arranged at different metal layers, the contact-hole shorting bar is connected to the transition line through the contact hole, the contact-hole shorting bar comprises a first side edge and a second side edge arranged in parallel, and distances from an edge of the contact hole to the first side edge and the second side edge are greater than zero.

13. The display panel according to claim 12, wherein the distances from the edge of the contact hole to the first side edge and the second side edge are equal.

14. The display panel according to claim 13, wherein the shorting bar comprises a flat shorting bar, the transition line comprises a flat transition line, the flat shorting bar is electrically connected to the first bonding pad through the flat transition line, and the flat shorting bar and the flat transition line are formed by using a manufacture procedure of the same metal layer.

15. The display panel according to claim 14, wherein there are at least two flat shorting bars, each of the flat shorting bars is arranged at a different metal layer, and the flat transition line and the flat shorting bar connected thereto are formed by using the same manufacture procedure.

16. The display panel according to claim 12, wherein the contact-hole shorting bar comprises a first contact-hole shorting bar and a second contact-hole shorting bar, the first contact-hole shorting bar and the second contact-hole shorting bar are formed by using a manufacture procedure of the same metal layer, and the first contact-hole shorting bar and the second contact-hole shorting bar are arranged in parallel; and the contact-hole transition line comprises first contact-hole transition lines and second contact-hole transition lines, the data lines comprise a multiplicity of odd-numbered data lines and a multiplicity of even-numbered data lines, the odd-numbered data lines and the even-numbered data lines are arranged at intervals, the first contact-hole transition lines are coupled to the odd-numbered data lines, the second contact-hole transition lines are coupled to the even-numbered data lines, and the first contact-hole transition lines and the second contact-hole transition lines are arranged in parallel and are alternately arranged at even intervals.

17. The display panel according to claim 12, wherein the data lines comprise a first color resist data line, a second color resist data line, and a third color resist data line; the contact-hole shorting bar comprises a first contact-hole shorting bar, a second contact-hole shorting bar, and a third contact-hole shorting bar; the contact-hole transition line comprises a first contact-hole transition line connected to the first color resist data line and the first contact-hole shorting bar, a second contact-hole transition line connected to the second color resist data line and the second contact-hole shorting bar, and a third contact-hole transition line connected to the third color resist data line and the third contact-hole shorting bar; and the first contact-hole transition line, the second contact-hole transition line, and the third contact-hole transition line form a group and are arranged at even intervals.

18. The display panel according to claim 12, wherein the data lines comprise a first color resist data line, a second color resist data line, a third color resist data line, and a fourth color resist data line; the contact-hole shorting bar comprises a first contact-hole shorting bar, a second contact-hole shorting bar, a third contact-hole shorting bar, and a fourth contact-hole shorting bar; the contact-hole transition line comprises a first contact-hole transition line connected to the first color resist data line and first contact-hole shorting bar, a second contact-hole transition line connected to the second color resist data line and the second contact-hole shorting bar, a third contact-hole transition line connected to the third color resist data line and the third contact-hole shorting bar, and a fourth contact-hole transition line connected to the fourth color resist data line and the fourth contact-hole shorting bar; and the first contact-hole transition line, the second contact-hole transition line, the third contact-hole transition line, and the fourth contact-hole transition line form a group and are arranged at even intervals.

* * * * *